United States Patent Office 3,042,568
Patented July 3, 1962

3,042,568
METHOD AND APPARATUS FOR THE MANUFACTURE OF LAMINATED FABRIC BELTING
Richard Egon Ludowici, Warwick Edward Lukins, and Ray Emmerson Simmons, all of Sydney, New South Wales, Australia, assignors to J. C. Ludowici & Son Ltd., Sydney, New South Wales, Australia, a company of New South Wales
Filed Feb. 23, 1960, Ser. No. 10,361
3 Claims. (Cl. 156—137)

This invention relates to the manufacture of multi-ply fabric belting for power transmission and for conveyors. In our prior Australian Patents 150,980 and 163,812 we described a process and apparatus for the manufacture of such belting wherein the several plies of canvas were drawn in spaced relationship under tension through tanks containing a bonding medium. Then the plies were pressed together and the bonding medium was fused or cured by the application of heat. Subsequently the permanent elongation was removed from the belting in a stretching operation.

The present invention has been developed as a result of long and costly experiments with the method and apparatus subject to the prior patents. The result is that a method and apparatus has been devised which can be used more easily than the method and apparatus employed hitherto and the belting produced is superior in quality.

The method of manufacturing laminated fabric belting according to this invention consists of drawing fabric sheet of indefinite length from a spool and in a continuous operation and under tension passing said fabric sheet through a drying unit, a coating bath, a scraping unit and a heater; fixing a tailer to one end of said fabric sheet and winding the tailer and coated fabric sheet on another spool, connecting the other end of each coated fabric sheet to a heat resistant leader, mounting a plurality of spools having the coated fabric sheets thereon on independent movable carriers; connecting said leaders to a pull through unit, drawing the leaders and the respective sheets under tension between heaters, thence through a supplementary heating zone, thence between laminating rollers and pressure rollers and through a cooling zone, thence over a guide roller or rollers severing the leaders from the laminated belt when said leaders pass through the pull through unit, passing the laminated belt under tension around a winding roller, stopping the heating operation and severing the tailers from the respective sheets prior to said tailers reaching the laminating rollers.

Apparatus for manufacturing laminated fabric belting according to this invention consists of a coating machine adapted to tension and dry a fabric sheet of indefinite length and apply a plastic coating thereto and heat said plastic coating, a laminating machine having sheet tensioning means, heating means, laminating rollers, pressure rollers and a cooling zone incorporated therein, a pull through unit adapted to draw sheets of coated fabric independently and under tension between the heating means and between the laminating and pressure rollers whereby the sheets are bonded together to form a laminated belt, through the cooling zone and thence over guide rollers to a winding roller.

The invention will be described with reference to the annexed drawings, wherein.

Figure 3:
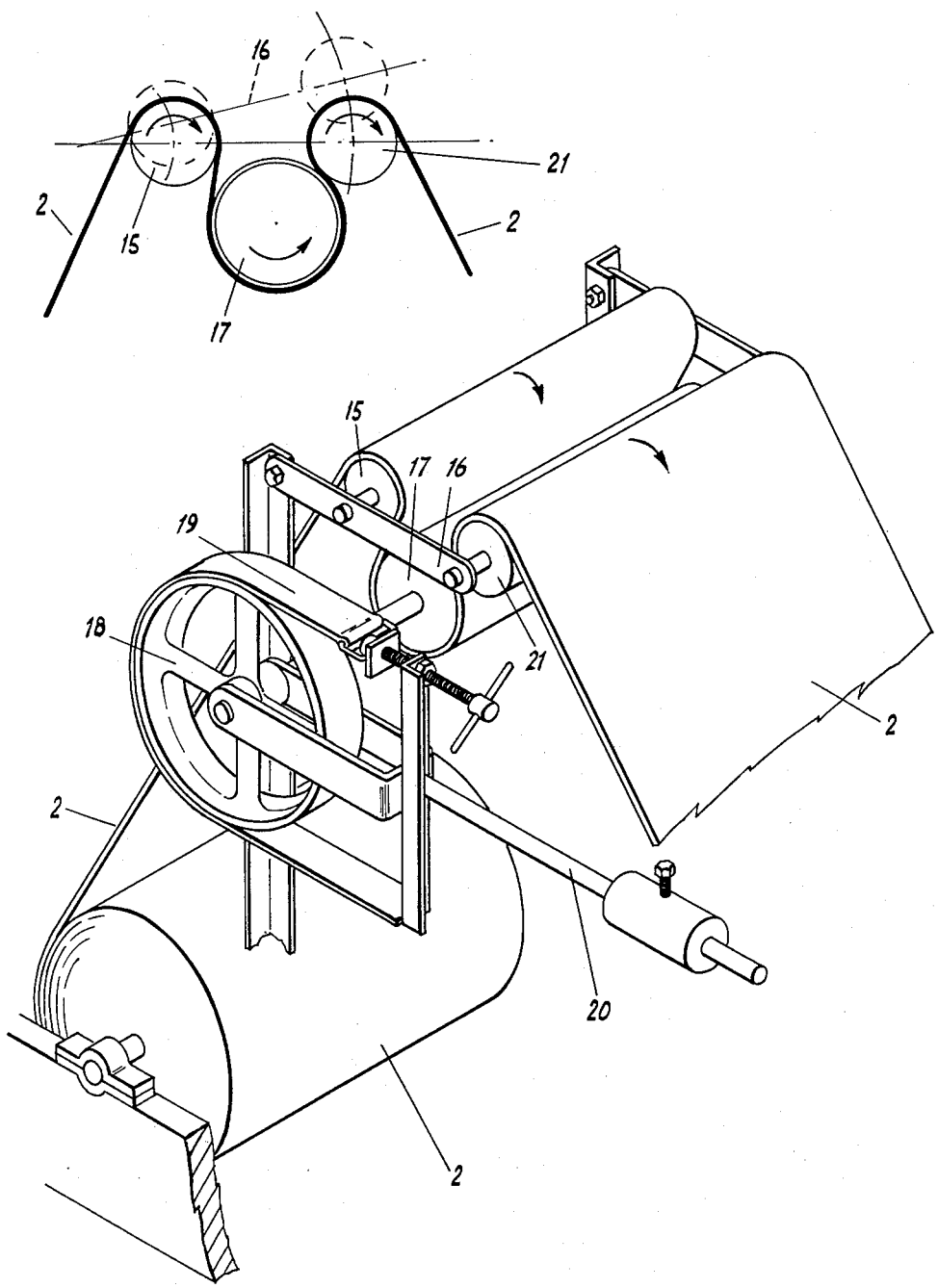
Figure 4:
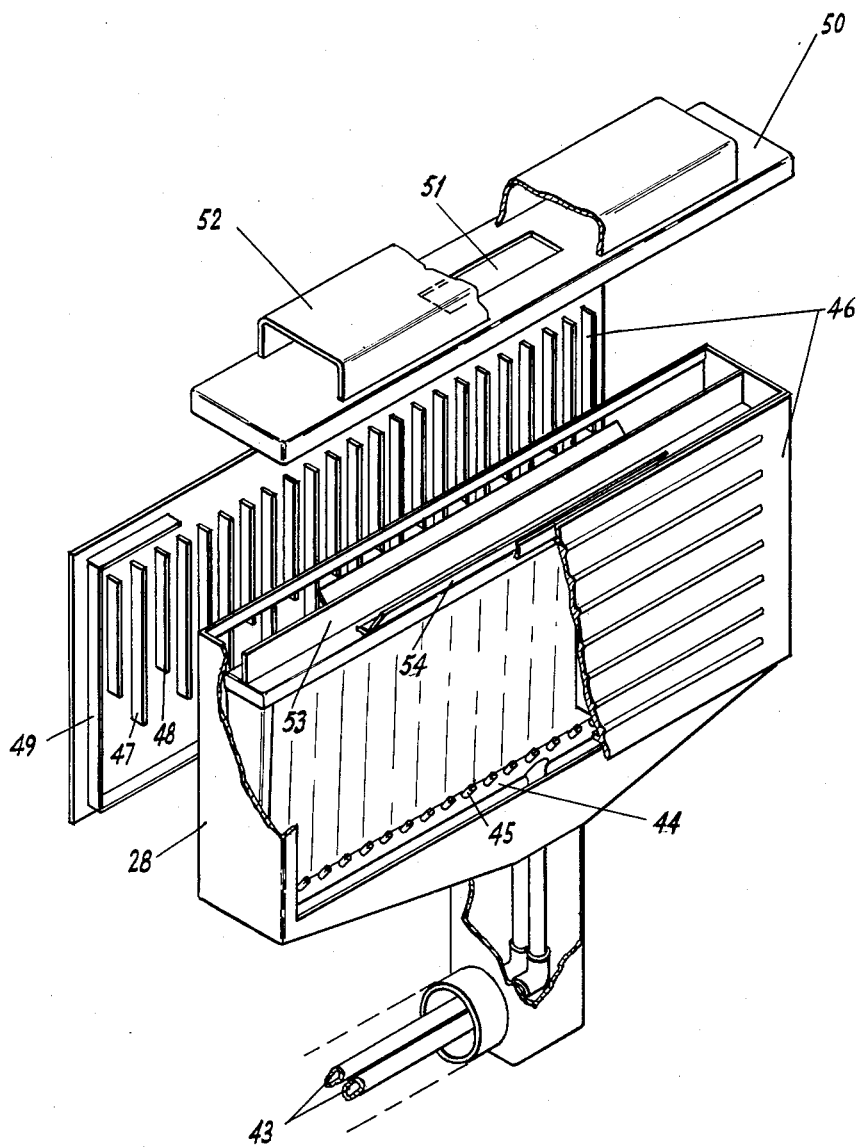
Figure 5:
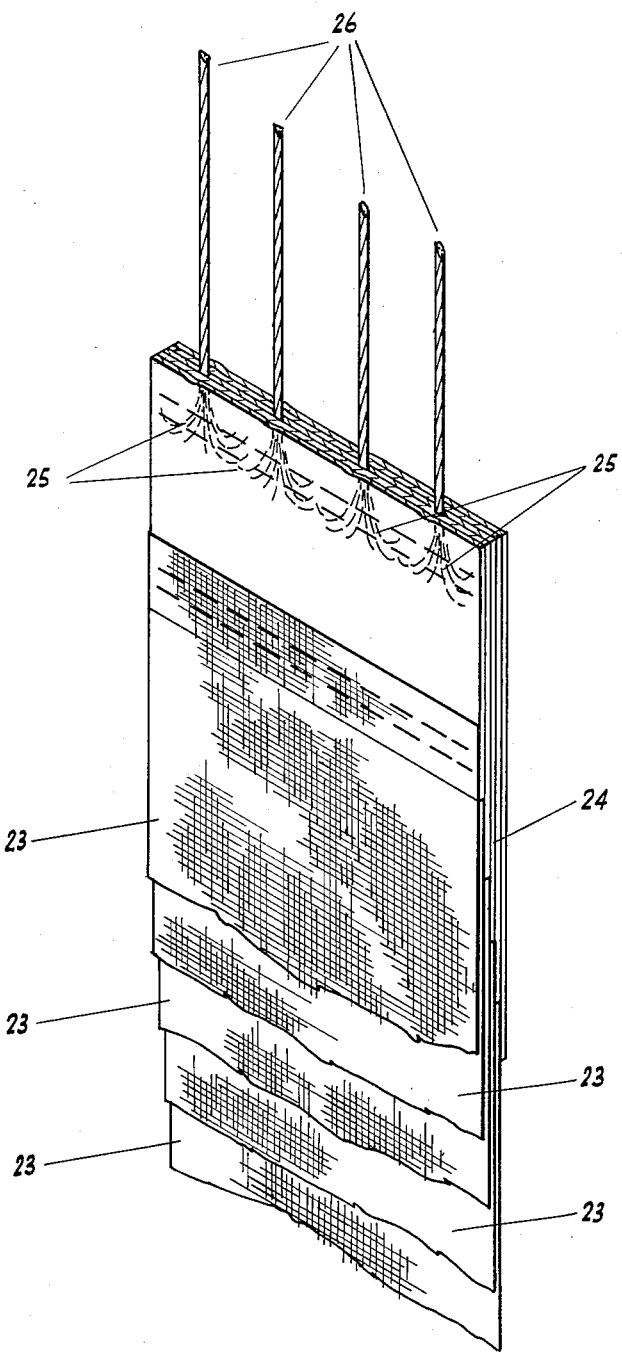
Figure 6:
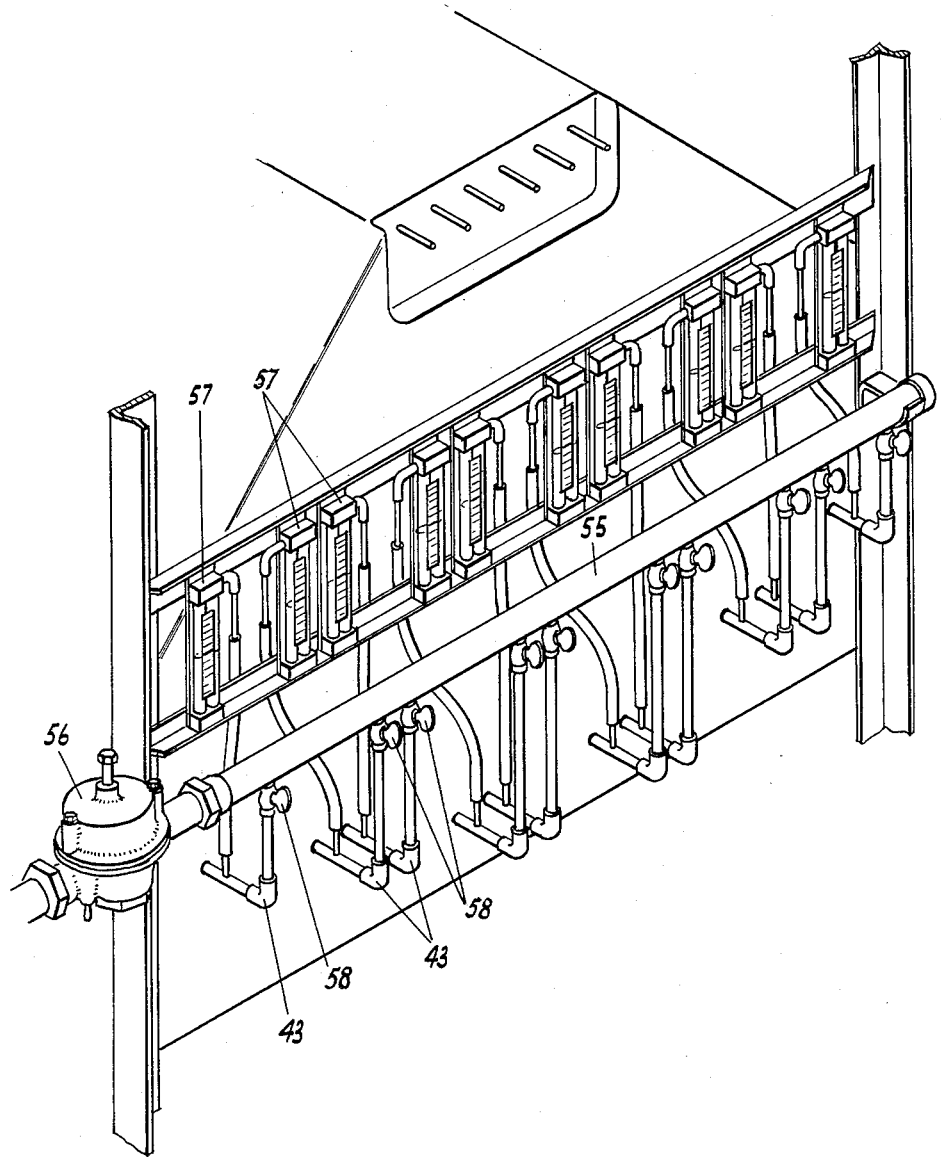

FIGURE 3 is a detail perspective view of fabric ply tensioning means incorporated in the present invention, FIGURE 4 is an exploded perspective view of one of the bank of heaters forming part of the laminating unit, FIGURE 5 is a perspective view of a leader for connecting the leading end of each coated fabric ply to the pull through unit, and FIGURE 6 is a perspective view of the heater portion of the laminating unit, showing the control means for the heaters disposed therein.

Figure 1:
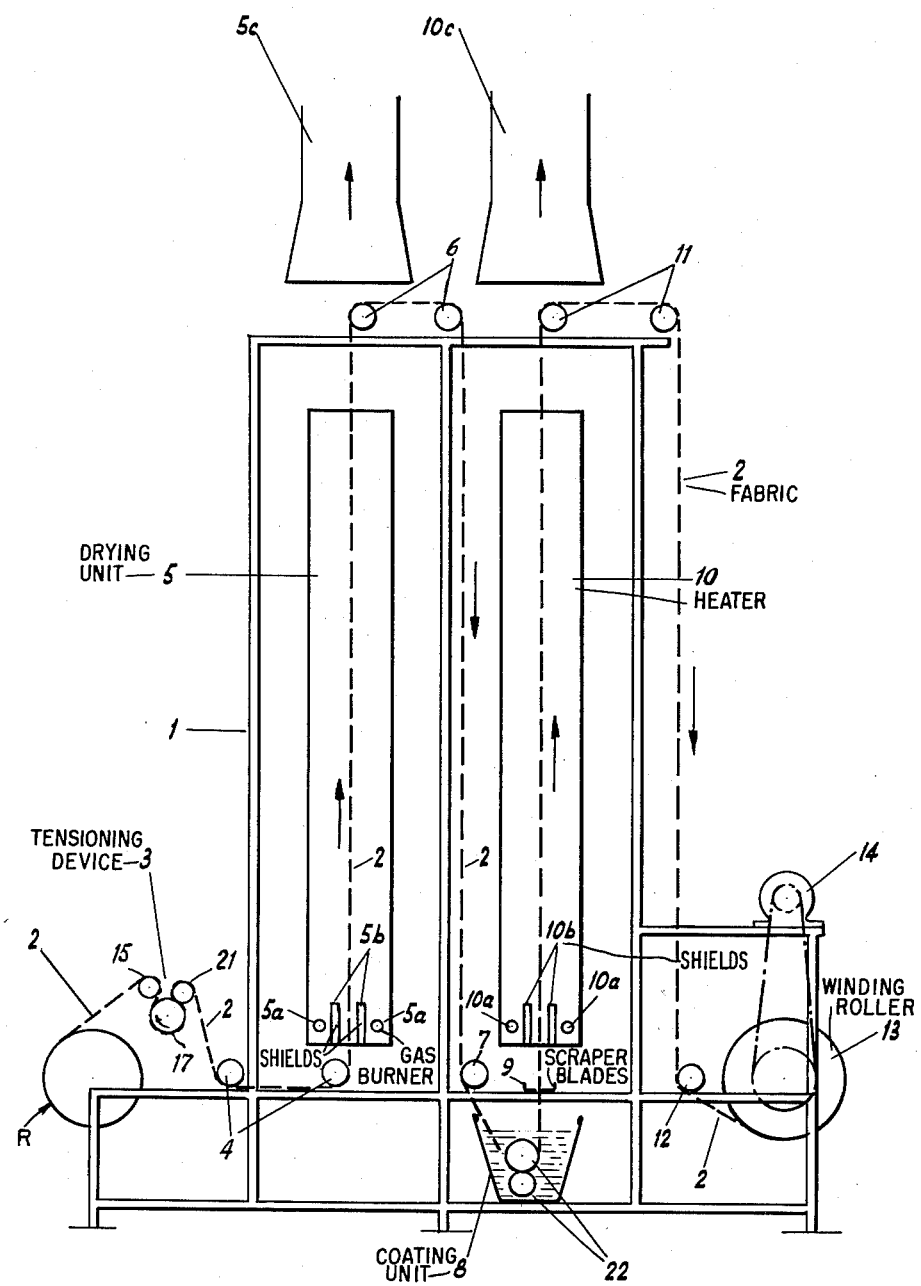
FIGURE 1 is a schematic view of the coating machine of the present invention.

Referring to FIGURE 1, the coating machine has a frame 1 and is adapted to have a roll R of fabric 2 such as canvas or duck rotatably mounted on one end thereof, and this fabric will be coated and will subsequently form one ply of a laminated fabric belt, and it will be referred to hereafter as a ply 2.

The ply 2 is passed through a tensioning device 3, beneath rollers 4, through a drying unit 5, over rollers 6, 7 to a coating unit 8, between scrapers 9, through a heater 10 thence over rollers 11, 12 to a winding roller 13 adapted to be driven by motor 14.

The tensioning device is particularly illustrated in FIGURE 3 and consists of a Prony brake wherein the ply 2 is passed from its coil over a roller 15, mounted adjacent one end of a pivoted frame 16, beneath a roller 17, the shaft of which has pulley 18 thereon with an adjustable brake band 19 thereon, said shaft also having a weighted lever 20 mounted thereon. The ply 2 passes between the roller 17 and a roller 21 mounted adjacent the other end of the frame 16, the said roller 21 being in engagement by gravity with the roller 17. This mechanism allows a desired tension to be applied to the ply 2.

The drying unit 5 is incorporated to remove excess moisture from the ply prior to coating the said ply, as excess moisture in the ply can have harmful effects upon the coating during fusing thereof. The drying unit 5 is heated by gas burners 5a which are shielded from the ply within the dryer 5 by asbestos or like shields 5b and hot air rises within the dryer 5 and passes out a flue 5c. After drying, the ply 2 passes out the top of the dryer 5 over rollers 6 and 7 in a cooling run, prior to passing to the coating bath 8.

The coating unit 8 has a tank adapted to be charged with a compound subject to fusion by the application of heat, preferably P.V.C. resin bonding paste, and the ply 2 is passed between rollers 22 which are disposed within the tank and thence between spring loaded adjustable doctor blades 9. The features of tensioning the ply 2 which tends to open the strands of the ply, the pressure applied by the rollers 22 and by the doctor blades 9 to the ply, gives a thorough coating to and between the said strands.

The ply 2 then passes through the oven 10, which has burners 10a, shields 10b and flue 10c similar to those in the dryer 5, to the winding roller 13 and is cut to the desired width and has a "tailer" stitched to the free end thereof. This tailer is simply a length of wire gauze which is stitched in a conventional sewing machine operation to the ply, and the tailer and the ply so cut to width are wound upon a roller and rolls of ply so coated and "tailed" are ready for the laminating operation.

Rolls of ply which have been coated, cut to width, and "tailed" in the manner described, each have the leading end thereof stitched to a length of heat resistant wire gauze 23 and the leading ends of the wire gauze lengths 23 are joined by stitching to a canvas or like former 24 which in turn has the splayed ends 25 of wire ropes 26 stitched thereto, thus forming a header for the ends of the respective plies, see FIGURE 5. The plies of the former 24 are preferably bonded with a belt cement as well as being stitched in the manner described. It will be appreciated that the "tailers" referred to need not be of heat resistant wire gauze as they are not subjected to high temperature heating, whereas the leading strands of gauze (hereinafter referred to as the leaders 23) connected to the header must be of heat resistant material such as stainless steel, as they are subjected, at least for portion of their length, to heat from the heaters 28.

Figure 2:
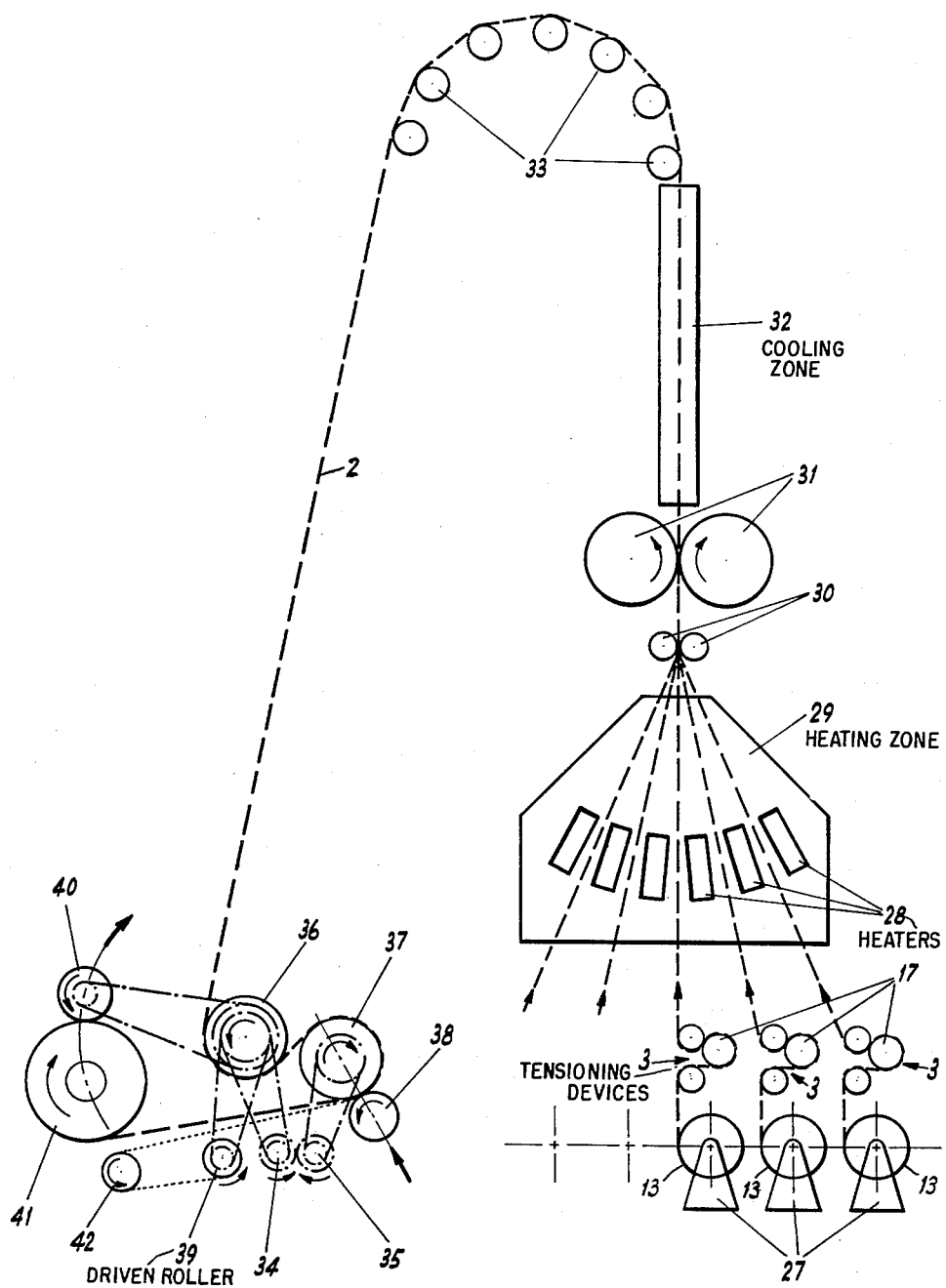
FIGURE 2 is a schematic view of the laminating machine and pull through unit.

Referring to FIGURE 2, coils of coated, cut and tailed ply are mounted upon individual laterally adjustable carriers 27 and there is a tensioning device 3 for each coil, similar to the tensioning device described with respect to the coating machine. In this case the roller 17, of each tensioning device is rubber coated to prevent slip of the leaders 23 and of the tailers.

Prior to commencing a laminating operation on the coated plies 2, each leader 23 is adapted to pass through its tensioning device 3, past burners 28 and through heating zone 29, between pneumatically adjustable laminating rollers 30 and pneumatically adjustable pressure rollers 31, through a cooling zone 32, over guide rollers 33 thence to the pull through unit. The header 24 is fixed to the leaders 23 and is located, for example, at a position above the pressure rollers 31, and the guide rollers 33 are grooved to act as guides for the wire ropes 26.

The pull through unit as illustrated, has a gear and chain drive 34, 35 to a first guide roller 36 and to a second guide roller 37, which latter is clutch controlled and which is adapted to have a pressure roller 38 brought into engagement therewith in the direction of the arrow shown in FIGURE 2. The first guide roller 36 is adapted to drive a roller 39 on which the wire ropes 26 and leaders 23 are to be coiled, and also drives a pressure roller 40 which engages by gravity, a roller 41 on which laminated belting is to be coiled. The pressure roller 40 is mounted in a frame which is pivoted on the shaft of the first guide roller 36, and it rises on the coil of laminated belting as the diameter thereof increases. Also this roller 40 is driven at a slightly higher speed than the guide roller 36 and thus tensions the belting as it is being wound on to the roller 41.

The operation of laminating the belt plies 2, and of coiling the wires 26, leaders 23 and laminated belting is as follows:

As described, the leaders 23 and wire ropes 26 are passed from the rolls on the carriers 27 through the laminating machine over rollers 33, 36, 37, idler roller 42 and thence to roller 39 and whilst the leaders 23 and ropes 26 are being drawn through the machine, the roller 37 is idling and the pressure roller 38 is disengaged. During this period, the heaters 28 have been put in operation and the temperature of the heaters 28 and the temperature in the heating zone 29 is checked and varied as desired, before the coated belting plies 2 reach the said heaters. This temperature adjustment period is important as it is essential that once the coated plies 2 commence to pass the heaters 28 and through the heating zone 29, the correct tension on each ply and the correct temperature is being maintained, as a balance must be maintained between the amount of radiant heat used and the time the fabric of the plies 2 is exposed to the heat. This is so as efficient bonding of the plastic coating in the respective plies during lamination of the plies is obtained at a temperature at which prolonged exposure of the fabric to such temperature would damage the fabric. Also, as the plies 2 commence to pass through the tensioning devices 3, the carriers 27 are individually adjusted laterally to ensure correct tracking of the plies.

When the plies have begun to pass through the heating zone 29, the laminating rollers 30 have been set to apply an initial uniform "tacking" pressure to the plies which then pass between the pressure rollers 31 and are given a final application of pressure to bond them into a laminated unitary belt. After laminating, the belt passes vertically through the cooling zone 32 and is cooled thereby sufficiently to prevent dishing or bowing of the belt as it passes over the guide rollers 33.

The belt then is drawn downwardly over guide rollers 36, 37 and when the belt starts to pass between guide roller 37 and pressure roller 38, the clutch of roller 37 is engaged and the said pressure roller 38 is brought into operation. At this stage the leaders 23 are severed from the belt and are finally wound on to the roller 39, whilst the belt is passed over its roller 41 beneath the pressure roller 40 and is wound thereon. This operation is continued until the tailers pass into the heaters, when the heaters are immediately shut off and cooled, whereupon the tailers are severed from the plies and the trailing ends of the plies are drawn through the machine.

Referring now to FIGURE 4, the heaters 28 intermediate the end heaters, each has a pair of supply pipes 43 connected to respective pipes 44 therein having fish tail burners 45 therein. The flames from these burners 45 overlap and they are directed towards hot plates 46 which have alternating long and short flutes 47, 48 thereon surrounded by a rib 49 and there is a cover member 50 with an outlet 51 therein and a duct 52 over the outlet, for the heater. Also there is a division plate 53 between the sets of burners 45 and a deflector 54 over the burners and beneath the outlet 51. In the end heaters only one set of burners and one hot plate is provided but the construction is similar to that described. This construction is such that heat from the burners radiates outwardly through the hot plates 46 and hot gases are caused to rise in varying directions to the outlet 51, along the duct 52 into the heating chamber 29. By creating a turbulence in the hot gases in the manner described, these gases become slightly pressurised and create a turbulence in the heating zone 29, thus tending to create an even "soaking" temperature within the said heating zone. This is desirable as the passage of the plies 2 past the heaters imparts to the plies a rapid preheating without prolonging the period at which the fabric is exposed to the temperature thereof.

As illustrated in FIGURE 6, the back of the heater chamber has a main gas supply line 55 thereon under the control of a conventional pressure governor 56, and a manometer 57 is provided for each set of burners 45 so that temperature variations can be achieved in each heater 28 by varying the pressure of gas supplied thereto, by appropriate use of the valves 58 provided.

It will be understood that laminated belting having from two to ten plies can be made by the method and apparatus described. For example, a "tacked" 2 ply belt is prepared to a desired length and is cut into lengths and each 2 ply length is treated as a single ply and they are laminated in the manner described to form a 10 ply belt.

We claim:
1. Apparatus for the manufacture of laminated fabric belting comprising in combination, a coating unit through which a length of fabric is passed from a supply roll to a driven winding roll, tensioning rollers adjacent said supply roll for opening the strands of the fabric, a drying unit for removing excess moisture from the fabric, guide rollers for conducting the fabric to and through said drying unit, a coating tank containing plastic material and having pressure rollers within said tank between which the fabric passes, further guide rollers intermediate said drying unit and said coating unit, doctor blades arranged above said coating tank to remove surplus coating from the fabric, a heating oven above said doctor blades and parallel to said drying unit to solidify the coating on said fabric, further guide rollers conducting said fabric to the driven winding roll, a laminating unit through which a plurality of coated lengths of fabric are passed including carriers each supporting a roll of fabric and fabric tensioning means above each of said rolls, a heating chamber above said tensioning means, a plurality of heaters within said chamber, laminating rollers and pressure rollers above said heating chamber for bonding the plurality of lengths of fabric into a laminated unitary belt, a cooling chamber above said pressure rollers, a pull through unit, further guide rollers between said cooling chamber and said pull through unit, and a winding roller on which the finished laminated belt is wound.

2. The apparatus of claim 1 including means connecting the leading end of each length of fabric to a roller of said pull through unit, said means comprising a length of heat resistant material attached to the end of each length of fabric, a former to which each of said lengths of heat resistant material are attached, and cables having one end secured to said former and the opposite end secured to a roller of said pull through unit.

3. An improved method for the manufacture of laminated fabric belting, said method consisting of drawing fabric sheet of indefinite length from a spool and in a continuous operation, passing said sheet through a tensioning device, drying the sheet to remove excess moisture, cooling the sheet, passing the sheet through a coating bath, scraping excess coating material from the sheet, heating the sheet to solidify the coating, fixing a tailer to one end of said fabric sheet and winding the tailer and coated fabric sheet on another spool, connecting the other end of each coated fabric sheet to a heat resistant leader, mounting a plurality of spools having the coated fabric sheets thereon on independent movable carriers, connecting said leaders to a pull through unit, drawing the leaders and the respective sheets under tension between heaters, through a supplementary heating zone, between laminating rollers and pressure rollers and through a cooling zone, thence over a guide roller or rollers, severing the leaders from the laminated belt when said leaders pass through the pull through unit, passing the laminated belt under tension around a winding roller, stopping the heating operation and severing the tailers from the respective sheets prior to said tailers reaching the laminating rollers.

References Cited in the file of this patent

UNITED STATES PATENTS

| | | |
|---|---|---|
| 1,929,839 | Dawson | Oct. 10, 1933 |
| 2,119,476 | Webb | May 31, 1938 |
| 2,711,982 | Straka | June 28, 1955 |

FOREIGN PATENTS

| | | |
|---|---|---|
| 163,812 | Australia | July 4, 1955 |